US006430556B1

(12) United States Patent
Goldberg et al.

(10) Patent No.: US 6,430,556 B1
(45) Date of Patent: Aug. 6, 2002

(54) SYSTEM AND METHOD FOR PROVIDING A QUERY OBJECT DEVELOPMENT ENVIRONMENT

(75) Inventors: Robert N. Goldberg, Redwood City; Gloria Y. Lam, Milipitas, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/431,672

(22) Filed: Nov. 1, 1999

(51) Int. Cl.[7] .............................................. G06F 17/30
(52) U.S. Cl. ........................ 707/4; 707/102; 717/108; 717/109; 717/113; 717/124
(58) Field of Search ................................. 717/1, 2, 4, 5, 717/108, 109, 124, 113; 345/764; 714/38; 709/320; 707/103, 102

(56) References Cited

U.S. PATENT DOCUMENTS

| | | | | |
|---|---|---|---|---|
| 5,487,141 A | * | 1/1996 | Cain et al. ................... | 345/764 |
| 5,499,371 A | * | 3/1996 | Henninger et al. ............ | 717/2 |
| 5,504,885 A | * | 4/1996 | Alashqur ....................... | 717/5 |
| 5,625,783 A | * | 4/1997 | Ezekiel et el. .............. | 709/320 |
| 5,644,764 A | | 7/1997 | Johnson et al. | |
| 5,737,609 A | * | 4/1998 | Reed et al. ...................... | 717/4 |
| 5,765,159 A | * | 6/1998 | Srinivasan ................... | 707/102 |
| 5,815,653 A | * | 9/1998 | You et al. ...................... | 714/38 |
| 5,819,282 A | | 10/1998 | Hooper et al. | |

(List continued on next page.)

OTHER PUBLICATIONS

Tai, Kuo–Chung; Daniels, Fonda J., "Test order for inter–class integration testing of object–oriented Software", IEEE, Computer Software and Applications Conference, 1997. Proceedings., The 21st Annual International, pp.: 602–607.*

Kasik, David J.;George, Harry G., "Toward automatic generation of novice user test scripts", ACM Press, ACM Special Interest Group on Computer–Human Interaction, 1996, Series–Proceeding–Article, pp. : 244–251.*

Moro, G.; Natali, A.; Sartori, C., "Data Access Services and Automatic Generation of Cooperating Interfaces", IEEE, Cooperative Information System, 1998.Proceedings. 3rd IFCIS International Conference, pp. 177–186.*

*Primary Examiner*—John Breene
*Assistant Examiner*—Leslie Wong
(74) *Attorney, Agent, or Firm*—Kudirka & Jobse, LLP

(57) ABSTRACT

A query object generator tool which generates interface definitions and code that implement a query object also generates a graphic user interface (GUI) for controlling the generator tool and plug-in objects, including a database schema access query object and test objects for allowing the GUI to operate with vendor-specific databases. The GUI is "customized" by the various plug-in objects. For example, the database schema access query object is designed specifically for a particular underlying database and retrieves "metadata" concerning the database schema. The retrieved metadata is then displayed as part of the graphic user interface to assist the user in constructing a query object. Test objects are also generated by the GUI in response to a user request. The test objects contain information that characterizes the query object for testing purposes. The information in the test objects is used with a test framework to install and initialize the query object. The test framework also uses the information in the test objects to customize part of the GUI in order to allow a user to view and interact with the installed query object. In particular, the customized GUI allows a developer to enter input parameters for a query directly from the interface and use the installed query object to perform a query with the input parameters. Results which are returned from the query are displayed on the interface.

25 Claims, 15 Drawing Sheets

U.S. PATENT DOCUMENTS

| | | | |
|---|---|---|---|
| 5,822,587 A | * 10/1998 | McDonald et al. | 717/2 |
| 5,953,526 A | 9/1999 | Day et al. | |
| 5,983,016 A | * 11/1999 | Brodsky et al. | 717/1 |
| 6,003,037 A | * 12/1999 | Kassabgi et al. | 707/103 |
| 6,006,224 A | 12/1999 | McComb et al. | |
| 6,047,284 A | 4/2000 | Owens et al. | |
| 6,076,092 A | 6/2000 | Goldberg et al. | |
| 6,081,808 A | 6/2000 | Blackman et al. | |
| 6,108,659 A | * 8/2000 | Vincent | 707/101 |
| 6,163,776 A | * 12/2000 | Periwal | 707/101 |
| 6,199,195 B1 | * 3/2001 | Goodwin et al. | 717/1 |
| 6,212,672 B1 | * 4/2001 | Keller et al. | 717/1 |
| 6,263,328 B1 | * 7/2001 | Coden et al. | 707/10 |
| 6,282,547 B1 | 8/2001 | Hirsch | |

* cited by examiner

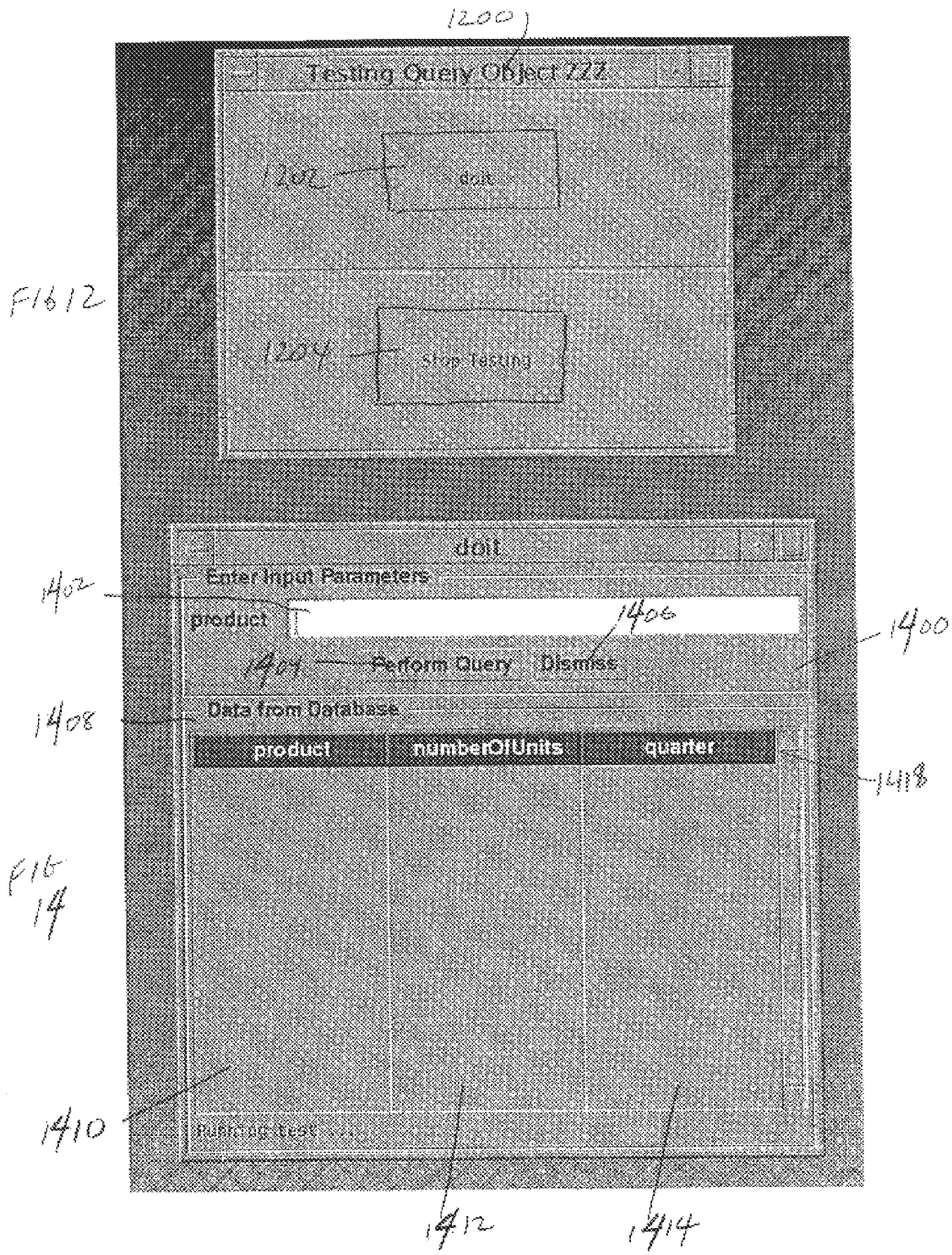

SYSTEM AND METHOD FOR PROVIDING A QUERY OBJECT DEVELOPMENT ENVIRONMENT

FIELD OF THE INVENTION

The present invention relates, in general, to databases and methods for accessing such databases with query objects, and, in particular, to apparatus and methods for interactively constructing, testing and using such query objects.

BACKGROUND OF THE INVENTION

Databases represent an important data processing area in many applications. They are often used to store large amounts of information and then efficiently retrieve selected portions of the information. Many present day systems use a client/server database approach in which application programs running in clients access a central database management system (DBMS) located in a database server. In order to efficiently access the information in the database, the clients form queries which request information with selected characteristics. The queries are transmitted to the DBMS server which retrieves the desired information which meets the characteristics specified in the query. The results (commonly called a "result set") are returned to the client.

Presently, such database environments are predominantly based on a "two-tiered" model consisting of a top tier containing one or more applications which generate queries that access the DBMS server in a bottom tier. The two-tiered model suffers from several drawbacks. First, the queries must be formulated in a specific query language, which is accepted by the DBMS server. While standard query languages exist, such as the Structured Query Language (SQL), specific DBMS query languages are often non-standard as a result of proprietary extensions made to the basic SQL query language. As a result, application programs written to generate queries in a particular query language are often not portable between different DBMS servers.

In addition, in order to generate the queries in the first place, each application developer, and, in some cases, the ultimate user, must understand the mechanics of the database, including the relationship of the files and tables therein and any relationships in the data required by the database organization. These relationships are commonly referred to as "business logic" since the relationships are typically based on shared business processes, practices and policies. Therefore, many parties must learn the business logic in order to generate meaningful queries.

Further, commonly-performed routines are typically replicated in each application program even if the application programs operate within the same business environment because each application functions autonomously from other applications. This replication results in poor code re-use and maintenance problems if the replicated routines must be changed.

Consequently, there is a trend towards using a three-tiered model for database environments. Generally, the top tier in such a model consists of clients containing the application programs and the user interfaces, the middle tier consists of code that embodies the business logic and the bottom tier consists of the DBMS servers which contain the data. In this model, the applications are implemented as "thin" clients, all of which interface with the business logic by means of a common interface which does not involve knowledge of the business logic. The commonly-performed routiner are all consolidated into the middle tier as part of the business logic. Since the business logic is shareable between the clients, code replication is avoided. The Common Object Request Broker Architecture (CORBA) presents one object-oriented approach to forming a three-tiered database environment, such as described in R. Orfali et al., "The Essential Client/Server Survival Guide," pp. 375–458, John Wiley & Sons, Inc. (2d ed. 1996), the disclosure of which is incorporated herein by reference.

Several prior art methods of implementing the three-tiered model exist, however, most existing DBMS access mechanisms and tools, including fourth generation languages (4GLs) and application programming interfaces (APIs), have been designed for the two-tiered model and are ill-suited for use in the three-tiered model. Consequently, several prior art designs including "database" objects and "active data" objects have their own strengths and drawbacks. One promising prior art approach to constructing a middle tier containing business logic uses "query objects." Each query object is a server object that:

(1) translates client method invocations into equivalent queries in a query language which is understood by a database;
(2) issues those queries to the database; and
(3) returns the results as strongly-typed data values.

The query object effectively encapsulates the DBMS specific query language so that the application programs do not have to know or use the DBMS query language. Query objects also encapsulate the database organization or "schema", so that query object clients are isolated from database changes (although the query object itself may have to be changed if the underlying database must be changed.) Query objects also present their clients with a DBMS independent API, for example, CORBA defines an Interface Definition Language (IDL) interface. They do not require that the data be mapped into objects as is the case with active data objects so that significant performance advantages can be obtained and concurrence issues avoided.

Each query object provides, as part of its interface, one or more parameterized methods. Calls on each method are translated by the query object into one or more standard queries such as SELECT, UPDATE, INSERT and DELETE or into the initiation of one or more stored procedures in the database. In order to use the query object, a client first establishes a connection to the query object via some mechanism, such as a CORBA naming service. One of the methods is invoked and the query object then executes the query. The method is then invoked to execute the query.

However, in order to operate properly, the query object must be constructed to generate the correct DBMS queries in response to client requests. Otherwise, the query object may operate as designed, but produce results which are not intended. Constructing a query object to generate the correct queries requires a knowledge of SQL, an understanding of the underlying database schema, the possible handling of intermediate results generated by the query and interpretation of the results. In addition, a query object developer must consider other issues such as connection to the database using CORBA or similar arrangement, concurrency problems and translation required between the interface used by the query object and the API used by the database. Consequently, tools have been developed to automate the generation of query objects. Some tools can generate a query object from a query described in conventional SQL language which is entered by a user.

However, even with such tools, it may be necessary to understand the schema of the underlying database in order to correctly construct the initial SQL query and map the SQL query into the query language used by the underlying database.

Further, a need for testing the generated query object with actual data exists. For example, the query may not have been correctly written by the user or may produce unexpected results. In order to generate a test facility for the query object, it may be necessary to understand the internal construction of the query object and its operation. If the query object was generated with an automated tool, information concerning the construction of the object and its operation may not be readily available and it may be necessary to examine the inner workings of the query object in order to properly construct a test platform. In addition, if the query object is used with a distributed object system, it may be necessary to first install, then locate the query object in order to test it.

While these latter operations are well-known, they can be time-consuming details which distract the user from other, more important work. It would be highly desirable to coordinate the creation, initialization and testing functions in an integrated environment, preferably an integrated visual environment. Such an environment would allow a user to easily view the specifics of the underlying database, quickly construct a query object, install the object and test it with actual input data and with the actual database on which it is to operate and then easily modify the object if it does not perform as expected and retest the object.

Finally, it would also be desirable to be able to easily connect such a development environment with databases sold by different vendors so that a consistent interface is presented to the user no matter which database is actually used to execute the query.

Therefore, there is a need to provide a visual integrated development environment for generating, installing, initializing and testing of query objects which can operate with different databases while presenting a consistent interface to a user.

SUMMARY OF THE INVENTION

The foregoing problems are solved in one illustrative embodiment of the invention in which a query object generator tool which generates interface definitions and code that implement a query object also generates a graphic user interface (GUI) for controlling the entire system and plug-in objects, including a database schema access query object and test objects for allowing the GUI to operate with vendor-specific databases.

The GUI has a fixed appearance which is "customized" by the various plug-in objects. For example, the database schema access query object is designed specifically for a particular underlying database and retrieves "metadata" concerning the database schema. The retrieved metadata is then displayed as part of the graphic user interface to assist the user in constructing a query object.

In accordance with one embodiment of the invention, the user writes a query which is to be implemented as part of a query object in a generic query language such as SQL. The database schema access object can be used to verify the syntax of the generic SQL query by converting the query to the vendor-specific language used by the database and submitting the query to the database engine.

In accordance with another embodiment of the invention test objects are also generated by the GUI in response to a user request. The test objects contain information that characterizes the query object for testing purposes. The information in the test objects is used with a test framework to install and initialize the query object. The test framework also uses the information in the test objects to customize part of the GUI in order to allow a user to view and interact with the installed query object. In particular, the customized GUI allows a developer to enter input parameters for a query directly from the interface and use the installed query object to perform a query with the input parameters. Results which are returned from the query are displayed on the interface.

BRIEF DESCRIPTION OF THE DRAWINGS

The above and further advantages of the invention may be better understood by referring to the following description in conjunction with the accompanying drawings in which:

FIG. 12 is a screen display generated by the TESTQOFrame object.

FIG. 14 is a screen display illustrating the results of a query performed with a query object showing input parameter names and output column titles.

DESCRIPTION OF THE PREFERRED EMBODIMENT

Figure 1:
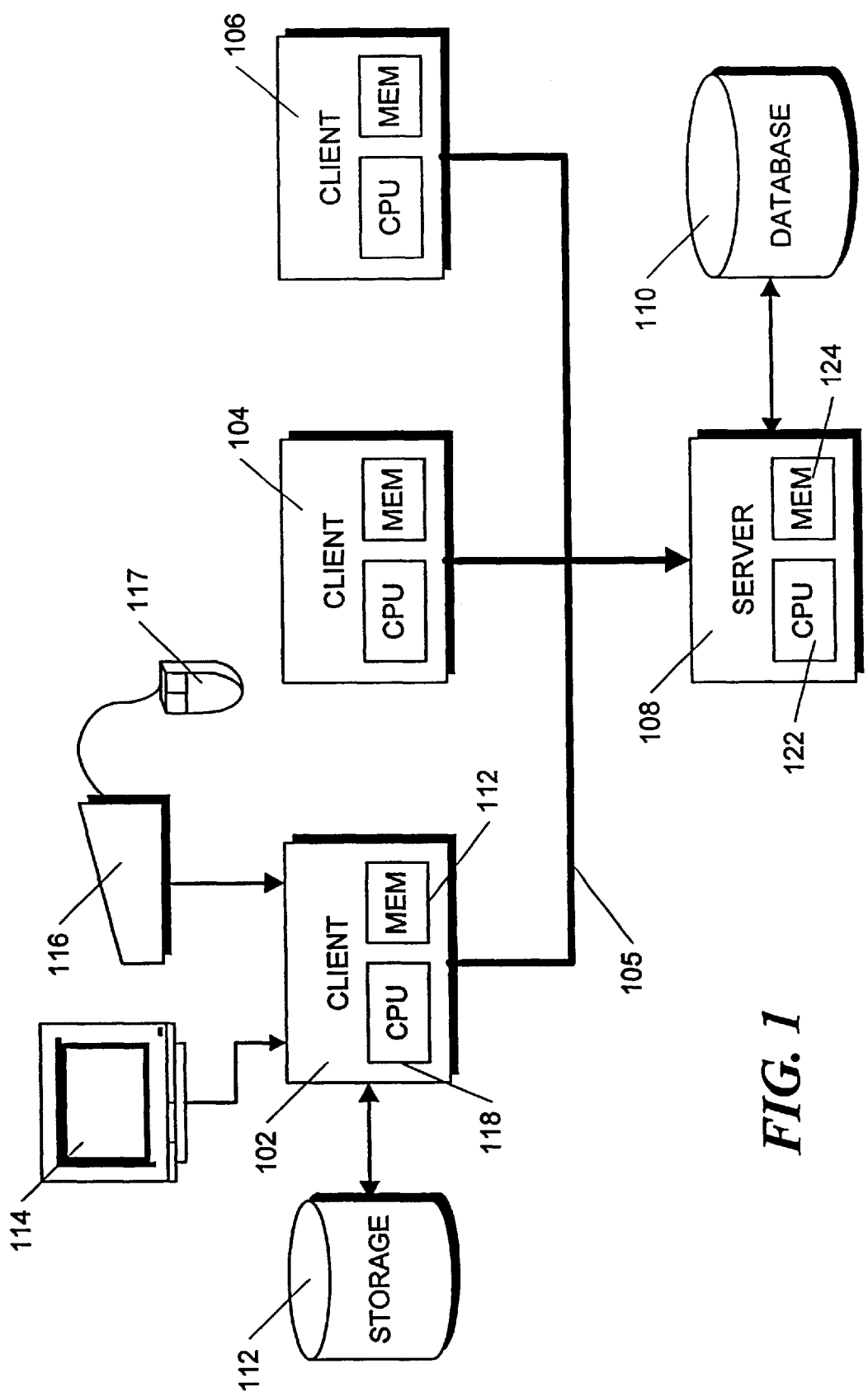
FIG. 1 is a block schematic diagram of a client server system on which the present invention can be operated.

FIG. 1 is a block diagram of a system 100 on which an illustrative query object generator tool constructed according to the present invention can run. As shown, the system 100 is a distributed computing environment comprising a plurality of individual computer nodes 102, 104, 106 and 108. The nodes are functionally organized into clients 102, 104 and 106 and at least one server 108 interconnected over a network 105. However, the clients 102, 104 and 106 and server 108 can also be implemented on a single node. Each node, whether a client 102, 104, 106 or server 108, is a conventionally programmed digital computer, respectively including a central processing unit (QPU) 118, 122, and a main memory 112, 124 interconnected with the CPU 118, 122. In addition, each client 102–106 and server 108 can include user interfacing devices, such as a monitor 114, keyboard 116 and mouse 117 and a storage device 112 (shown in FIG. 1, by way of example, for just one client 102). The server 108 includes a database 110, such as a relational database, file system or other organized data storage system. The individual components implementing each node 102–108 are interconnected over a central system bus (not shown) used for exchanging address, data and control signals, although other forms of component interconnections are possible. Finally, the system 100 can include devices for accepting computer-readable storage mediums (not shown) and can be interconnected with the network 105 for exchanging data and control signals transmitted as a computer data signal in a carrier wave.

In the described embodiment, each node 102–108 is a network connectable computer, such as a Sun SparcStation™5 workstation running the Solaris™ operating system, a version of the UNIX® operating system, or an IBM-compatible computer, running the Windows NT™ operating system. However, use of the systems and processes described and suggested herein are not limited to a particular computer configuration. SparcStation™ and Solaris™ are trademarks of Sun Microsystems, Inc., Mountain View, Calif. UNIX® is a registered trademark of The Open Group, Cambridge, Mass. Windows NT™ is a trademark of Microsoft Corporation, Redmond, Wash.

Figure 2:
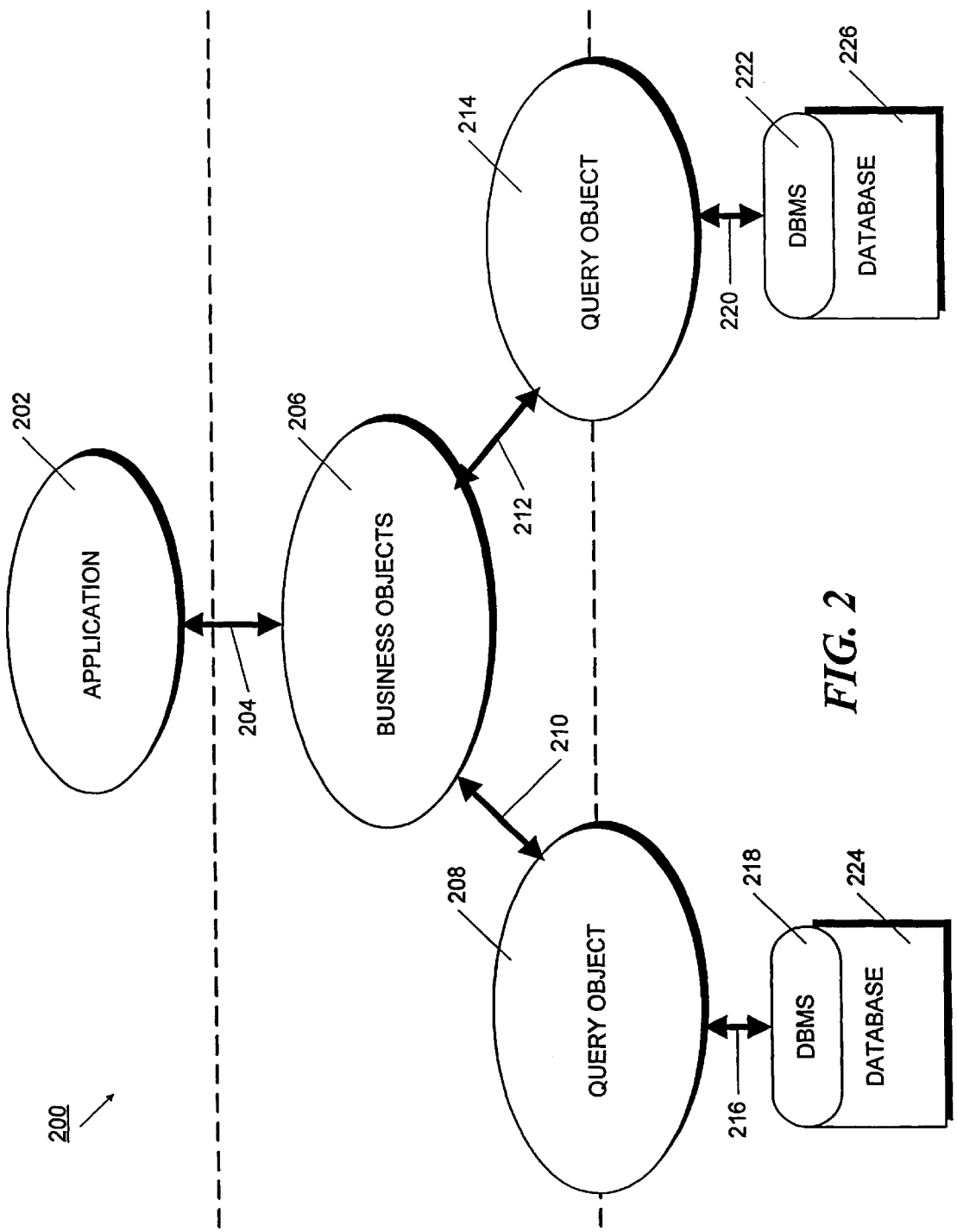
FIG. 2 is a block schematic diagram illustrating the interaction between client object, business objects and query objects in a three-tiered system.

Distributed computing environments can be logically viewed as of a set of cooperating software components, referred to as "objects," being executed on one or more computers interconnected by a network. The individual applications running on each computer can share a set of standard or application-specific objects and executing an application can cause it to interact with and use other software objects available locally and throughout the network. Each such object can, in turn, itself use other software objects. Thus, an application in a distributed computing environment can consist of the combination of application-specific objects and the combined local and remote objects it uses. When one object calls an operation on another object, the calling object is referred to as the "client" while the called object is referred to as the "server." FIG. 2 is a block schematic diagram of a database client/server environment 200 using query objects 208 and 214 as might be implemented in the system 100 of FIG. 1. The environment 200 is functionally structured into three tiers. In the top tier 203, a client 102 (shown in FIG. 1) executes an application 202. The application 202 interacts, as indicated schematically by arrow 204, with business logic in the middle tier 205. The business logic is implemented as one or more business objects 206 (only one business object 206 is shown) and, in turn, interfaces with query objects 208 and 214. Both the business object 206 and the query objects 208 and 214 can be executed on either a client 102 or a server 108 (shown in FIG. 1). Other combinations and .configurations of objects, including business object 206 or query object 208 and 214 are feasible.

In the bottom tier 207, a server 108 and an associated database 110 (shown in FIG. 1) include database management systems (DBMS systems) 218 and 222 (which may be executed on the server 108) along with associated databases 224 and 226, respectively. Query objects 208, 214 allow the business logic implemented in the business object 206 to access the DBMS systems 218, 222 without knowledge of the DBMS schema or query language.

More particularly, query objects 208, 214 are server objects that translate client requests into appropriate DBMS queries, issue those queries to the DBMS systems and return the results to the client. Functionally, each query object 208, 214 creates a logical "wrapper" that encapsulates a specific, application-dependent set of queries and provides the results to its clients as strongly typed values. Each query object 208, 214 is associated with a single DBMS system 218, 222, respectively, and has the capability of interacting with specific DBMS query APIs (represented by arrows 216 and 220) and parameters for the queries. However, the query object provides a DBMS-independent API (represented by arrows 210 and 212, respectively) to the business object 206 for accessing the databases 224, 226. Each query object also provides a mechanism for managing connections to the DBMS systems 218, 222 associated with the databases 224, 226, including methods for locating the databases 224, 226 in the distributed environment, methods for logging on to the DBMS systems 218,222 and facilities for managing the connection resources. A query object may also provide multi-threading support, if necessary.

Each query object may include several distinct queries. The query object code for each query is created by a query object generator tool in response to a query written by the query object developer in a standard language, such as SQL. In order to assist the developer in writing the SQL language queries, the query object generator tool utilizes the inventive database schema access object to retrieve and to display the schema of the underlying database to the developer. Since the database schema access object is closely tied to the underlying database, the database schema access object also serves as a repository of code to perform other database-related activities. These activities include, submitting a proposed query to the underlying database query engine in order to validate the query and performing data type translations between the SQL data types used in the developer-formulated queries and the vender-specific data types of the underlying database.

Figure 3:
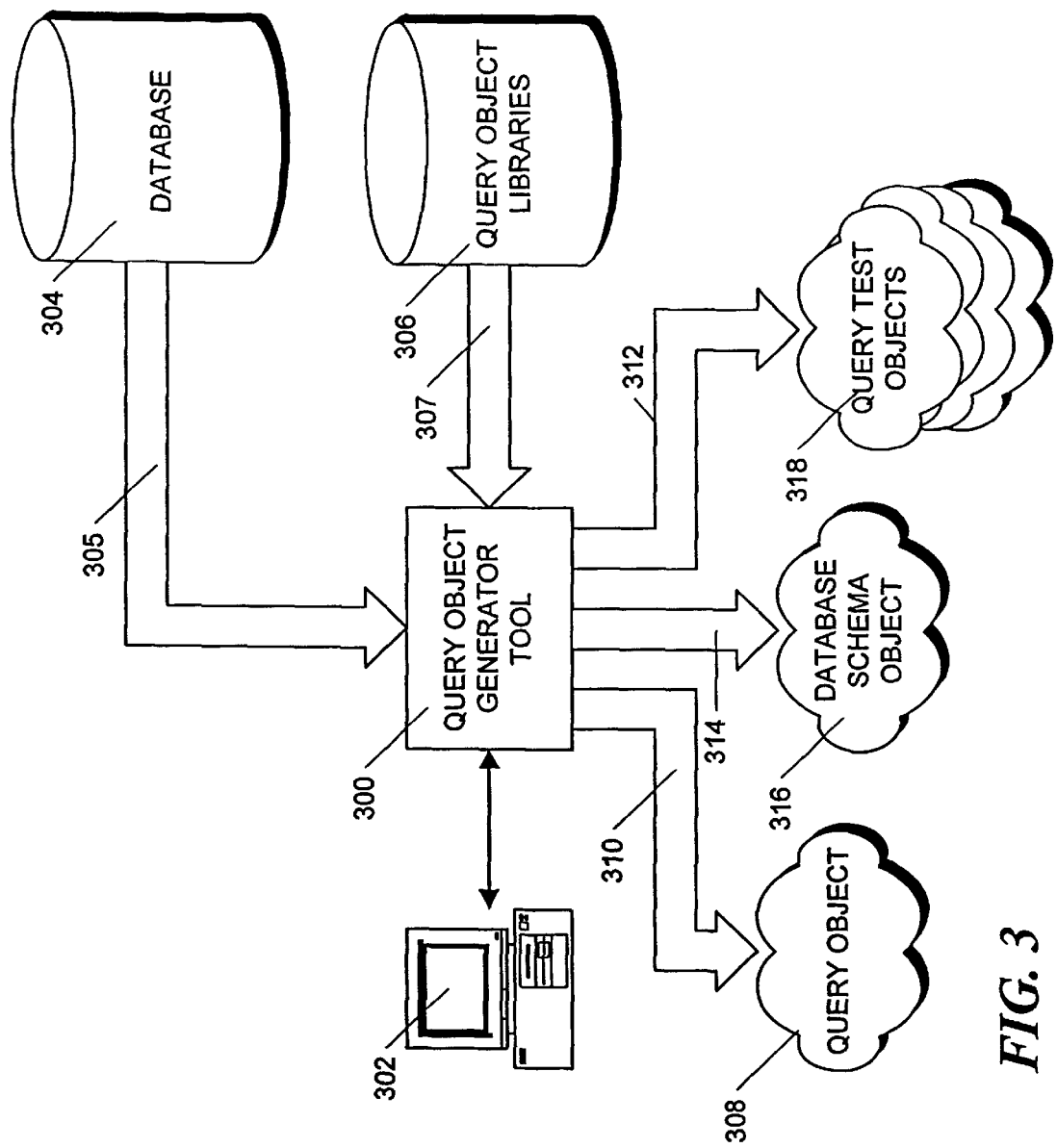
FIG. 3 illustrates the generation of a query object and associated test objects, query test objects and a database schema access object from information in the underlying database and query object library files.

Query objects can be hand coded, but can also be generated by an automated generator tool. In accordance with the principles of the invention, the generator tool is controlled by a GUI and provides a completely integrated environment in which to. create, save, modify and test query objects. FIG. 3 illustrates the operation of a generator tool which generates the components of a query object and, optionally, the components of a database schema access object which allows the database schema to be displayed and test objects which test the query. In particular, the query object generator tool 300 utilizes information obtained from database 304 and query object libraries 306 to construct a query object 308, a database schema access object 316 and test objects 318. The query object generator tool 300 then uses the database schema access object 316 for obtaining the database schema from database 300 as indicated schematically by arrow 305. The database schema may be presented to a user by means of the GUI 302 to aid the user in formulating a query which is consistent with the database schema. When the query information has been obtained from the user, the query object generator tool 300 utilizes object-oriented class code found in the query object library 306 to instantiate code generator objects (not shown) as indicated schematically by arrow 307. The code generator objects then generate the source code for the query object 308 as indicated by arrow 310. The code generators may also generate build scripts (not shown) which allow the query object 308 to be built from the generated source code.

The code generators also use the information obtained from database 304 and libraries 306 to generate test objects 318 as indicated by arrow 312. The test objects correspond to the query object 308 and, each of the queries in the query object 308. The test objects 318 are used with a test framework to generate a test GUI which can display and run the queries in a query object as described below.

In the preferred embodiment, the client/server environment 200 is implemented in compliance with the Common Object Request Broker Architecture (CORBA), such as described in "The Common Object Request Broker: Architecture and Specification," Rev. 2.0, Object Management Group, Inc. (July 1995), the disclosure of which is incorporated herein by reference. The application 202, business object 206 and query objects 208, 214 each export an API defined in Interface Definition Language (IDL) and. interface with each other via an associated Object Request Broker (ORB) illustrated in FIG. 4. Each query object 208, 214 returns a set of IDL structures whose type is derived from the database schema at the time the query object 208, 214 is implemented and this interface is used by clients of the query object. In a similar manner the test object and each of the query test objects also export an IDL interface which insures that they will be compatible with the test framework.

Figure 4:
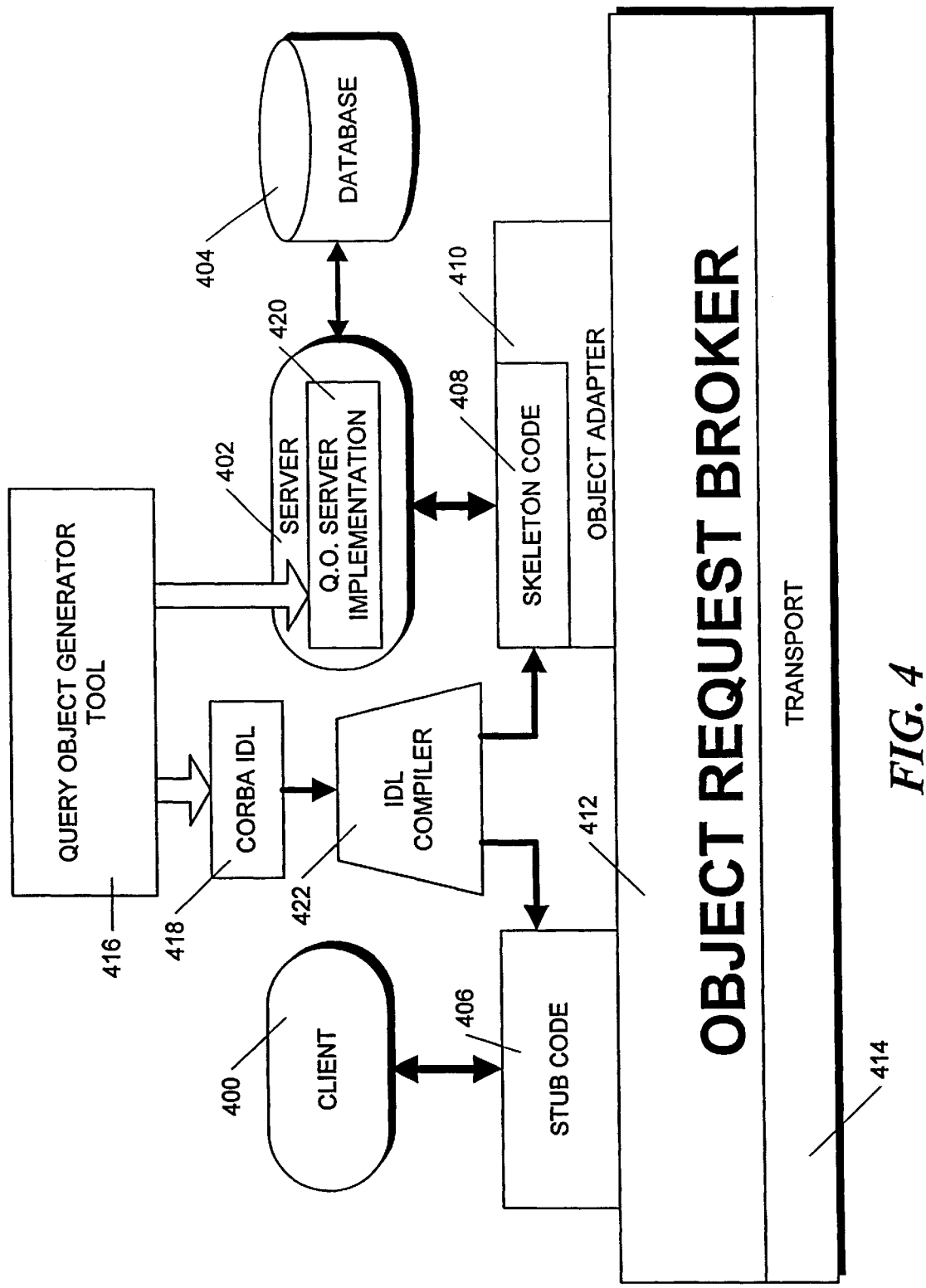
FIG. 4 illustrates how code generated by a query object generator tool is used with a CORBA distributed object system.

FIG. 4 illustrates, in a very schematic form, the basic CORBA architecture which defines a peer-to-peer distributed computing facility where all applications are objects (in the sense of object orientation). In such a system, a client 400 communicates with the server 402 by means of an object request broker or ORB 412 an object, such as a query object or a test object can be located on the server 402. The ORB 412 operates with a transport 414 that conveys information between the client 400 and server 402. The client 400 communicates with the ORB 412 by means of the aforementioned IDL interface and a reference to the query object or the test object. The object reference, in turn, contains an identification of the object implementation 420 in the server 402 so that the server 402 can pass a request to the correct object implementation. The object implementation 420 then performs the desired actions.

The entire CORBA architecture is actually implemented in a conventional programming language, such as C, C++, Smalltalk or JAVA. Implementations in a variety of languages are available from a number of vendors who typically provide a compiler, called an IDL compiler 422, bundled with their ORB products. The compiler 422 generates header files which define the OMG IDL interfaces and can be incorporated into application programs. The compilers also generate the client stub code 406 and the server skeleton code 408 for each interface.

The client 400, which may be the generator tool, can directly link to the OMG IDL stub code 406. As far as the client is concerned, an invocation of the stub code 406 appears to be a local function call. Once invoked, the stub code 406 provides an interface to the ORB 412 that encodes the operation's parameters into communication formats suitable for transmission on the transport 414 to the server 402. The stub code then transmits a request for service to the server 402.

At the server side, the OMG IDL skeleton code 408 is the corresponding it implementation of the OMG IDL interface. When the ORB 412 receives a request, the skeleton code 408 decodes the request parameters and generates a call to the object implementation 425 in the server 402. When the server completes processing of the request, the skeleton code 408 and stub code 406 return the results to the client 400. If an error has occurred, exception information generated by the server or by the ORB is returned. An object adapter 410 comprises the interface between the ORB 412, the skeleton code 408 and the server 420. Object adapters, such as adapter 410, support functions, such as registration of object implementations and activation of servers.

The query object generator tool preferably generates a query object, a database schema access object and test objects for use with a conventional CORBA system such as that illustrated in FIG. 4. When operating with such a CORBA system, the query object generator tool 416 generates CORBA IDL interface code 418. This IDL code is applied to a conventional IDL compiler 422 which, in turn, generates the client stub code 406 and the server skeleton code 408.

Figure 5:
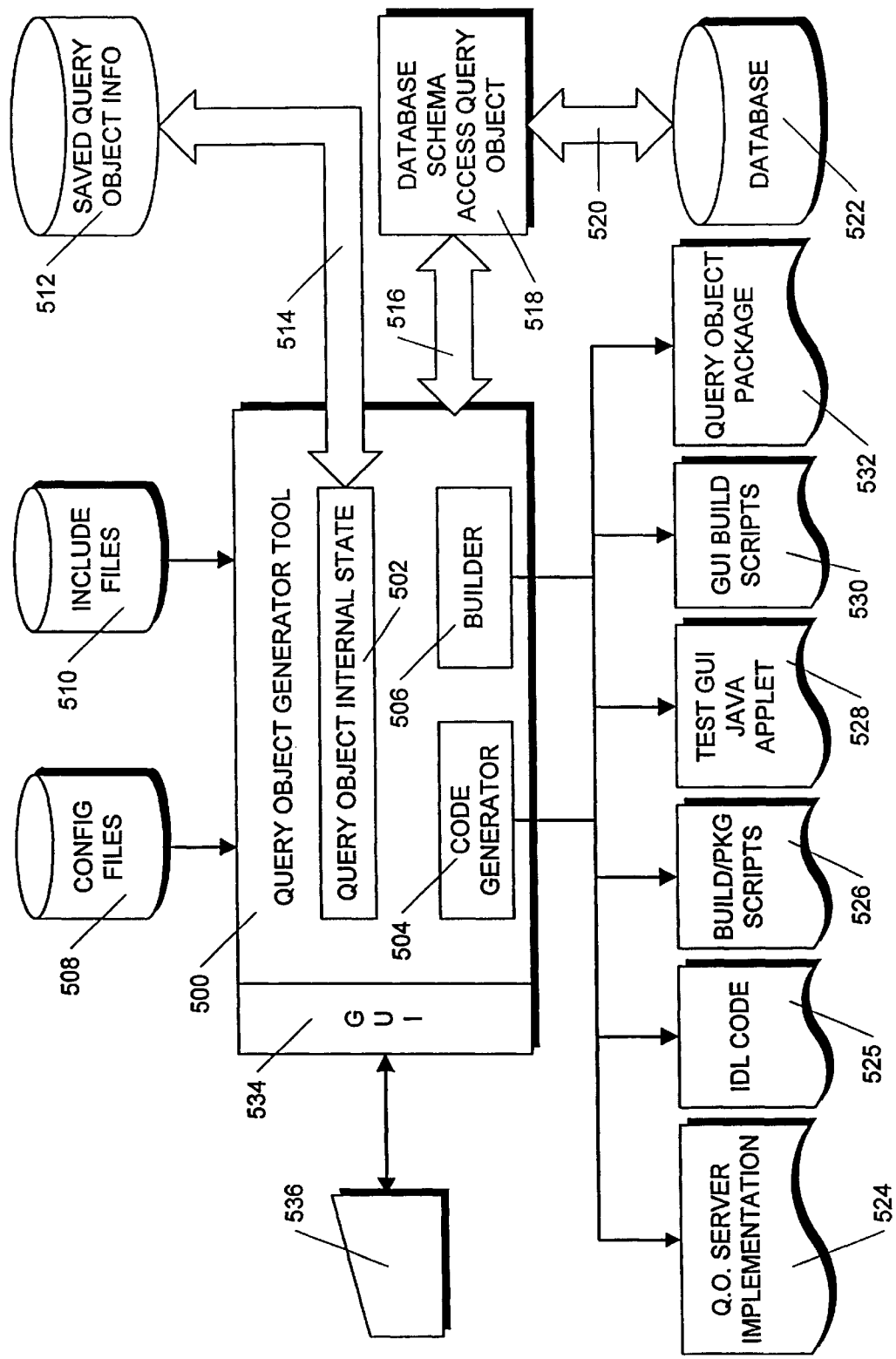
FIG. 5 illustrates the internal architecture of an illustrative query object generator tool.

The internal architecture of the query object generator tool which can be used to generate the aforementioned objects and which interacts with the objects is illustrated in block schematic diagram form in FIG. 5. The query object generator tool 500 comprises a query object internal state object 502, code generator object 504 and a builder object 506. The query object internal state object 502 allows the user to save a logical definition of a query object in an intermediate file, such as file 512. In particular, object 502 can store and retrieve file information in file 512 as indicated schematically by arrow 514. The information saved in file 512 is not the entire query object but is sufficient amount of information to be able to reconstruct the query object. This allows the user to open an existing query object for modification without having to restart from the beginning. In addition, the internal state object 502 does not contain database specific information which allows the same query object to be implemented with different vendor-specific databases without rewriting the query object.

The query object internal state object 502 is actually a collection of objects which model input parameters, result structures and various implementation options. In accordance with the principles of the invention, the query object generator tool 500 is controlled by a graphic user interface 534 which enables a user, at terminal 536, to operate interactively with the generator tool 500.

Generator tool 500 also receives information from the database 522 in order to allow the user to formulate a query and test the query. Extracting information from the database 522 can be performed in several manners. Preferably, generator tool 500 uses a database schema access object 518 to retrieve the schema of the underlying database 522 as indicated schematically by arrow 520. The schema information is returned to generator tool 500 as indicated by arrow 516 and may be presented graphically to the user by means of the GUI 534 on terminal 536. The schema information assists the user in formulating a query.

The generator 500 also receives input information from the configuration file 508 and include files 510. The tool 500 reads the configuration files 508 when it starts up. These files tell the tool 500 about the environment in which it is running and they include such information as the JDBC drivers that are available and the location of various software programs. The configuration files also contain the name of the include directory 510 which contains various "boilerplate" files. When the tool 500 starts up, it first tries to read the configuration file in a directory that is "hard coded" into the tool. If the configuration file is not found, the tool then looks for a configuration file in the user's home directory. If the file is still not found, the tool looks in the current directory.

Generator tool 500 may further receive query strings and parameter information from the user, via terminal 536. After the input information has been received, the query object generator tool 500 utilizes an appropriately selected code generator 504 to generate the source code which implements the query object. In particular, the code generator 504 generates the query object server implementation 524 and the query object IDL code 525 and, as mentioned above, may optionally generate a database schema access server implementation and IDL code. The code generator object which is actually used to generate specific query object source code must generate code which is compatible with the underlying database and is also written in the implementation language which is used to implement the CORBA server. Accordingly, the code generator classes are arranged in a class hierarchy with subclasses that depend on the implementation language and the underlying DBMS language.

In addition, the tool 500 may also generate build and package scripts 526 which can be used to build the objects from the source code 524 and the IDL code 525. The source code and the build scripts are provided to a builder object 506 which generates the final query object package 532 that can be installed on a CORBA server. As previously described, the query object IDL interface code 525 is provided to a conventional IDL compiler to generate the client stub code and server skeleton code.

Finally, the tool 500 can generate and build test objects which can test the queries in a query object.

Figure 6:
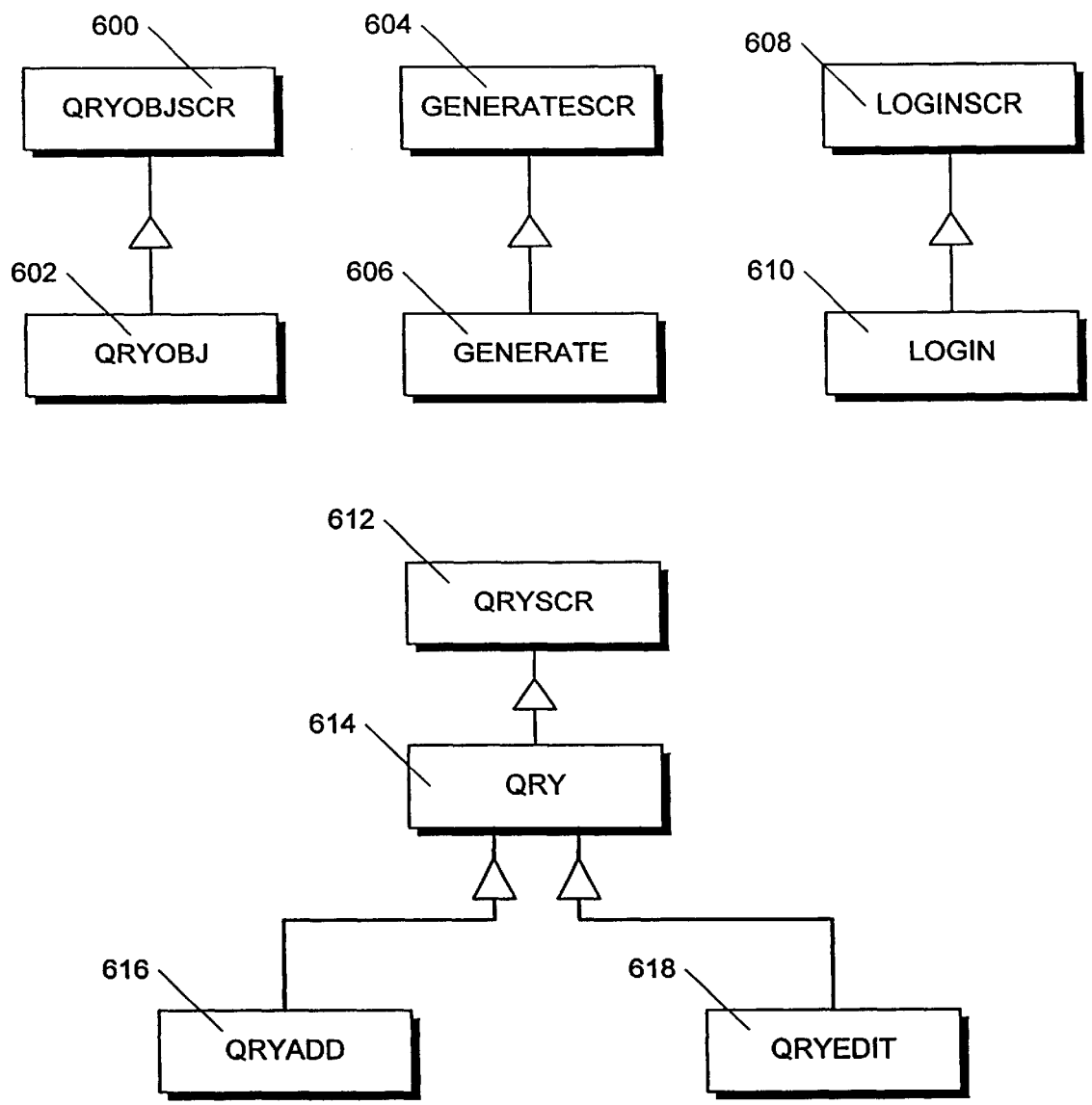
FIG. 6 is a class diagram of the classes used to construct the GUI screen displays.

In accordance with the principles of the present invention, the tool 500 is driven by a GUI 534 which controls all aspects of query object generation and testing and automates many of the routine chores. The classes which form the GUI are illustrated in FIG. 6. The QryObjScr class 600 and its subclass QryObj 602 create and display a "main" screen which allows a user to create and edit query objects. The QryObjScr class 600 contains the basic objects, menus and controls which form the display screen. The QryObj class 602 contains methods which start the display and process method selections from the main menu. These selections include the menu options "New", "Generate", "Add", "Edit", "Delete", "Open", "Save", "Saveas", "Properties" and "Exit".

Selection of the menu option "New" instantiates a login object from the login class 610 which is a subclass of the LoginScr class 608. As with the QryObjScr class 600, the LoginScr class 608 contains the basic objects, menus and controls which form the display screen whereas the Login class 610 contains methods which start the display and process method selections from command buttons on the login display screen.

Similarly, selection of the menu option "Generate" instantiates a Generate object from class 606 which descends from the GenerateScr class 604. The Generate object contains a method which creates a thread that, in turn, generates and builds a query object, generates and builds a test GUI for the query object and optionally runs the test GUI to test the object.

Selection of the "Add" menu option instantiates a QryAdd object from the QryAdd class 616 which, in turn, descends from the Qry class 614 that is a subclass of the. QryScr class 612. The QryScr Class 612 contains the basic objects, menus and controls which form the display screen whereas the Qry class 614 contains methods which start the display and process method selections from command buttons on the login display screen. The QryAdd class 616 customizes the display for the add function. Similarly, selection of the "Edit" menu option instantiates an object from the QryEdit class 618 which, in turn, descends from the Qry and QryScr classes 614 and 612.

Figure 7A:
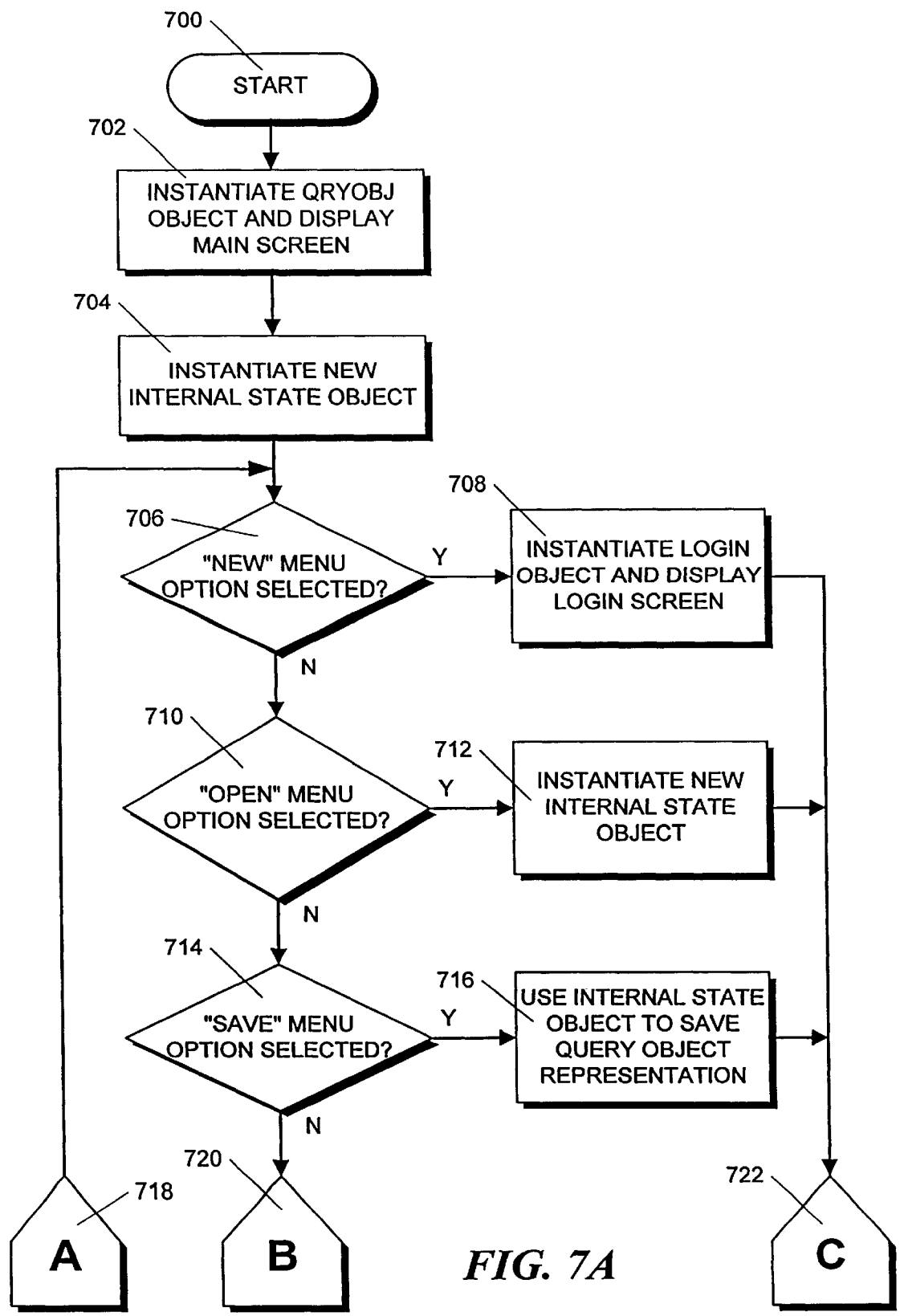
FIGS. 7A and 7B, when placed together, form a flowchart illustrating a routine which generates a main screen display for the GUI and handles button presses.
Figure 7B:
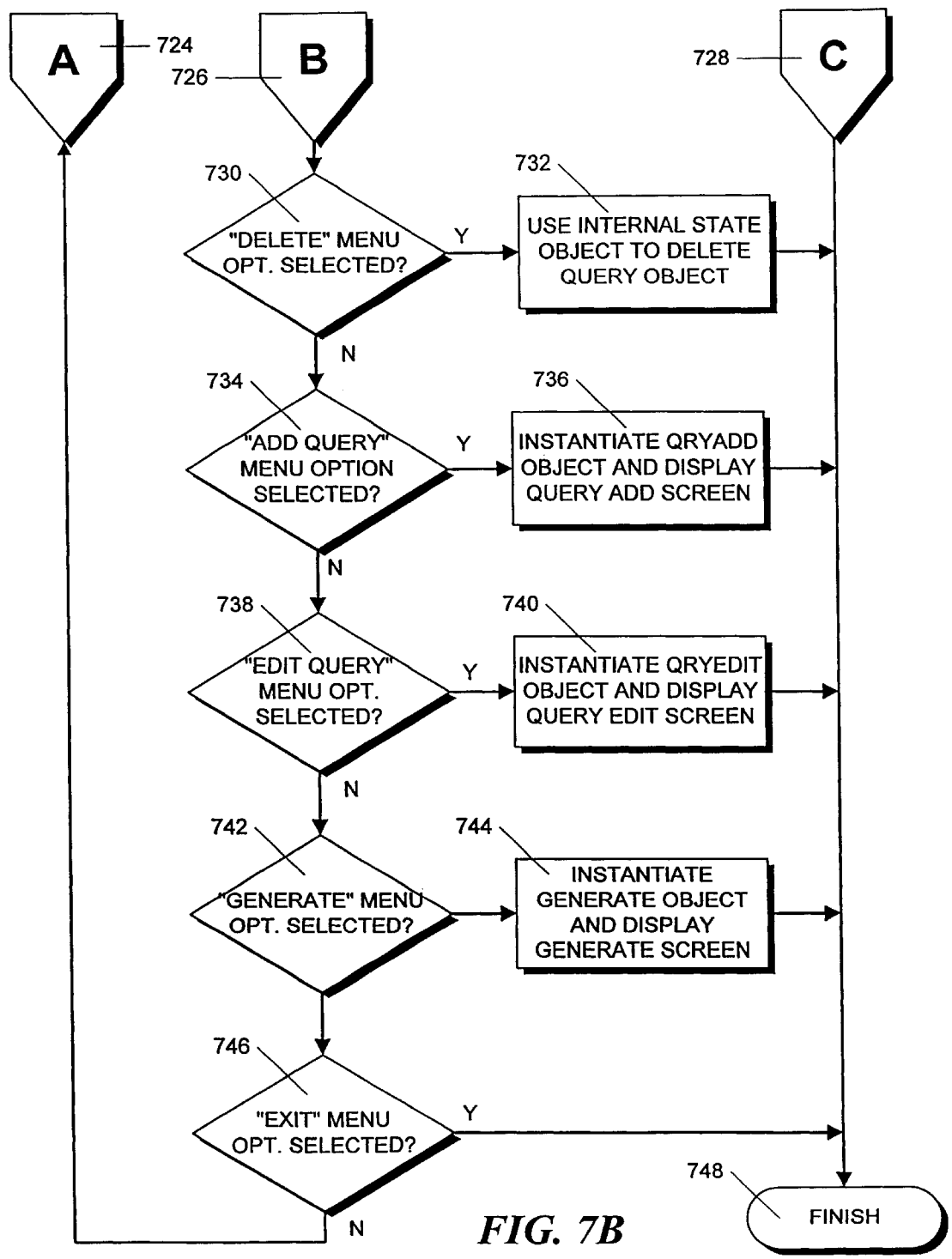

FIGS. 7A and 7B illustrate a basic routine which generates the main GUI screen of the present invention and processes menu option selections. The routine starts in step 700 and proceeds to step 702 where a QryObj object is instantiated from QryObj class 602. This instantiation might be performed by selecting a menu option on another program or via a command line interface. In any case, a show( ) method is called in the QryObj object to display the main screen. A new internal state object is also instantiated in step 704 in order to represent the query object which will be created or edited. The internal state object is used to describe the query object in a database independent manner so that the query object can be saved and edited at a later time. As discussed below, this internal state object can also be used to delete and save the query object.

Figure 8:
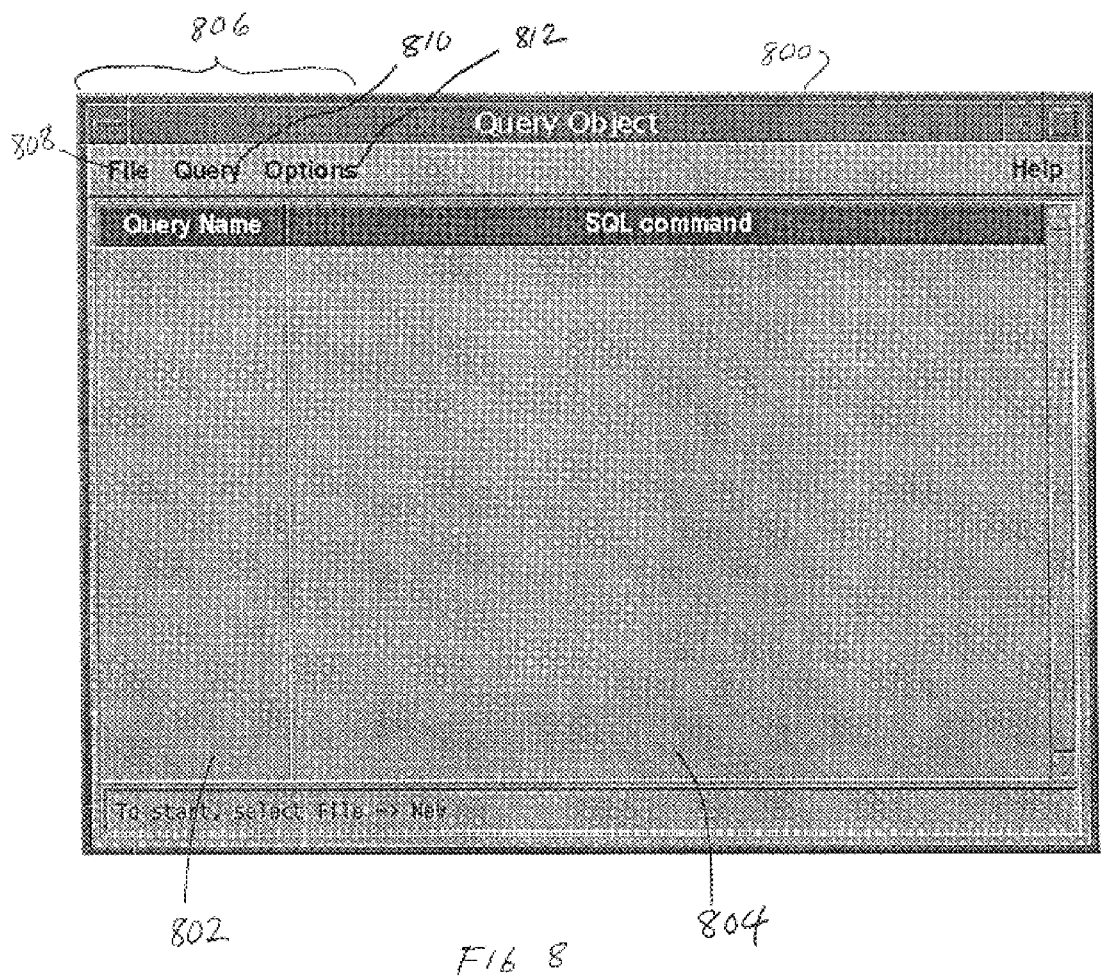
FIG. 8 is the GUI main screen display which allows a user to manipulate new and existing query objects.

The GUI main screen display is shown in FIG. 8. The query object generator tool is much like any other editing program which allows a user to define and examine one or more query objects, change their definitions and manipulate them in various ways. The query objects are selected by using a graphic user interface which has a list 804 of the queries in the query object which shows the state of the current query object being defined and a menu of operations 806 which allow a query object to be manipulated. For example, the "File" menu 808 options might include such options as "New" which would allow a new query object to be created. Another menu options might be "Open" which would allow an existing query object to be restored from an intermediate file. A "Save" option would allow the query object contents to be stored in the intermediate file.

Each query object contains one or more queries which are also displayed on the graphic display. The queries can be manipulated by other menu options 810. These options might include such operations as "Add Query", "Delete Query" and "Modify Query". Finally, further menu options 812 are provided which allow code for queries which have been created to be generated and built. The "Options" menu might include such options as "Generate."

Returning to FIG. 7, the routine then enters a menu selection routine consisting of decision steps 706–746 which perform various actions depending on which menu option was selected. For example, if the "New" menu option is selected as illustrated in step 706, then a Login object is instantiated from the login class 608. The Login object displays a login screen as indicated in step 708. The login screen is discussed below. After the login screen is displayed, the routine then proceeds, via off page connectors 722 and 728, to finish in step 748.

If the "New" menu option is not selected in step 706, the routine proceeds to step 710 where a determination is made whether the "Open" menu option has been selected. If the "Open" menu option is selected, the routine proceeds to step 712 in which a connection is opened to the selected query object. The previously instantiated internal state object receives the stored query object parameters.

Similarly, if, in step 714, the "Save" menu option is selected, then the routine proceeds to step 716 where a method in the internal state object is used to save the selected query object. In all three cases, the routine then finishes in step 748. If the "Save" menu option is not selected in step 714, the routine proceeds, via off-page connectors 720 and 724 to step 730 where a determination. is made whether the "Delete" menu option has been selected. If so, the routine proceeds to step 732 where a method in the internal state object is used to delete the selected query object. The routine then proceeds to step 748 to finish.

Individual queries in the query object can also be manipulated by using the menu options in the "Query" menu 810 (FIG. 8.) For example, in step 734, the routine determines whether the "Add Query" menu option has been selected. If so, then the routine proceeds to step 736 in which a QryAdd object is instantiated from the QryAdd class 610 and an add query screen (discussed below.) The routine then proceeds, to finish in step 748.

If, in step 734, the "Add Query" menu option is not selected, the routine proceeds to determine, in step 738, whether the "Edit Query" menu option has been selected. If so, a QryEdit object instantiated from the QryEdit class 614 and a corresponding display screen is displayed. The QryEdit object manipulates the query selected in list 804 (FIG. 8). The routine then finishes in step 748.

Alternatively, if the "Generate" menu option is selected as indicated in step 742, the routine proceeds to step 744 where a Generate object is instantiated and a generate display screen is displayed. The routine then proceeds to finish in step 748.

If in step 738 the "Generate" menu option is not selected, the routine proceeds to step 746 where a determination is made whether the "exit" menu option has been selected. If the "Exit" menu option has been selected, the routine ends in step in 748. Alternatively, if the "Exit" menu option was not selected, the routine returns, via off page connectors 724 and 718, to step 706 where the menu options are again reviewed. Operation continues in this manner until one option has been selected.

Figure 9:
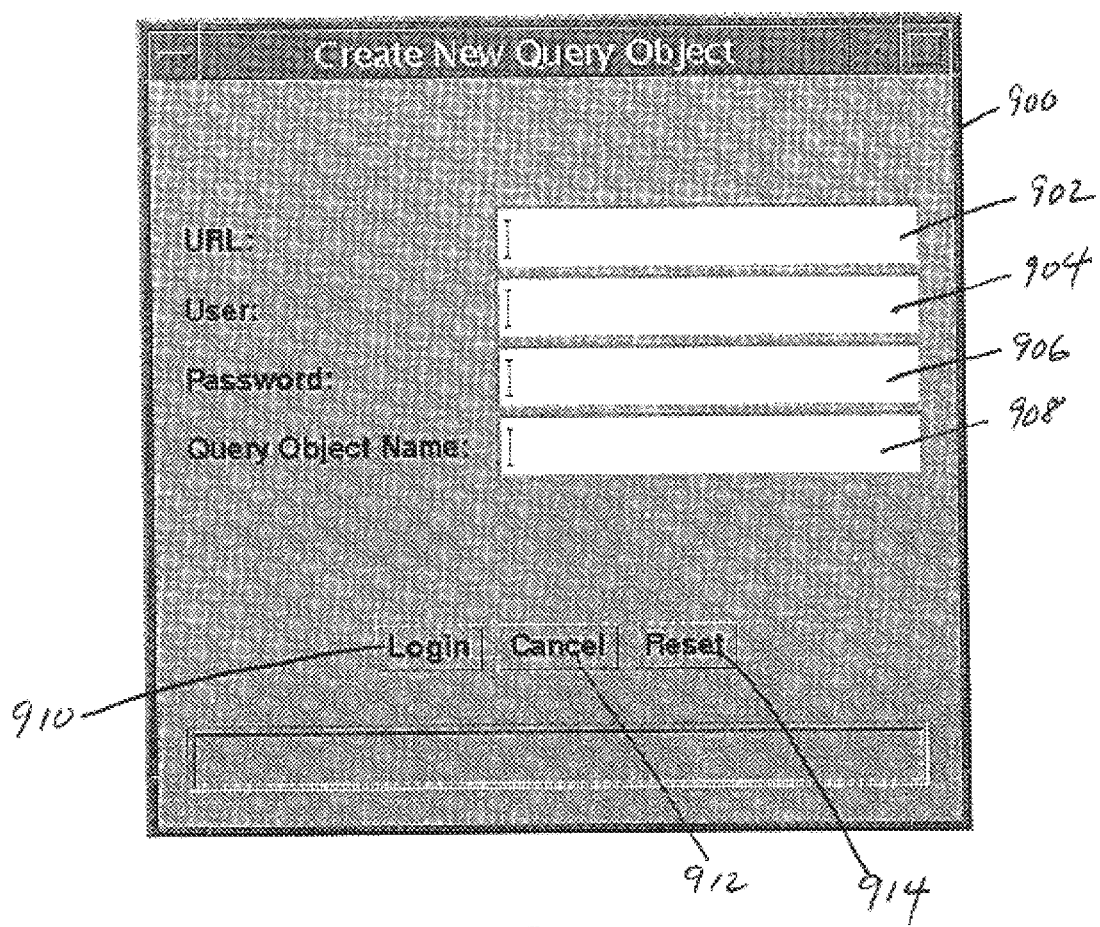
FIG. 9 is a screen display of a login screen which allows a user to login to a database for the creation of a new query object.

The login screen which is displayed by the graphic user interface when the user selects the "New" menu option is illustrated in FIG. 9. This screen is also displayed if the user tries to open an existing query object, but has not logged into the database which underlies the query object. This screen 900 includes four text fields 902, 904, 906 and 908 which allow the user to enter an identifier, such as URL, which specifies the location of a database in the network environment, the user's name and password and the name of the query object to be created.

After entering the information, the user presses a "Login" command button 910 which causes the query object generator tool to log in to the database located at the URL entered in text box 902 with the user's name and password entere[0084] in boxes 904 and 906, respectively. A connection to the query object whose name was entered into text box 908 is then attempted if the user is opening the object. Alternatively, the user can press a "Cancel" command button 912 to cancel the operation or a "Reset" command button 914 to clear all of the text fields 902, 904, 906 and 908 to blank.

Figure 10:
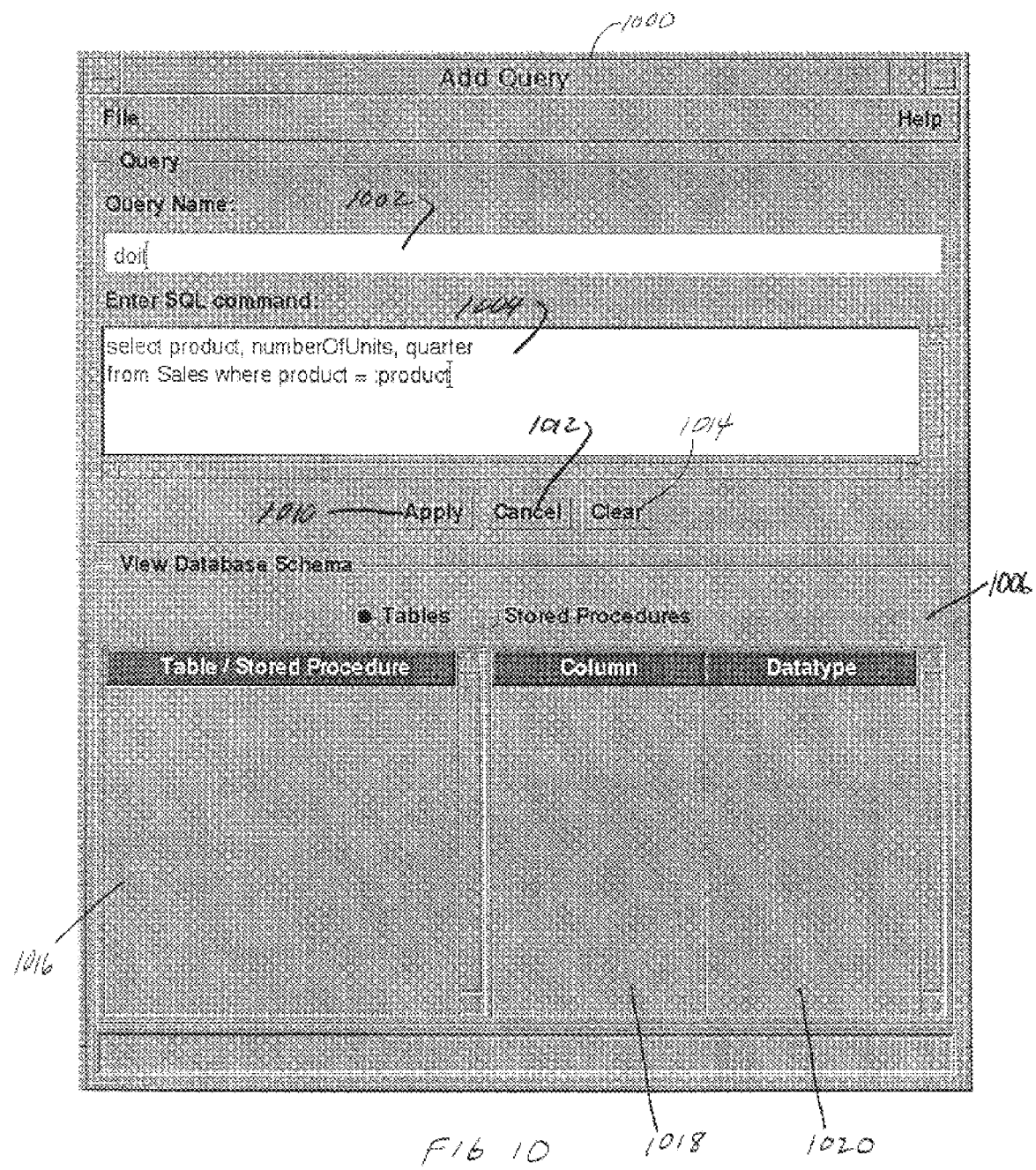
FIG. 10 is a screen display of a query add/edit screen which allows a user to create or edit the contents of a query object illustrating the customization of the GUI display using database schema information retrieved by the database schema access object.

Selection of the "Add Query" menu option instantiates a QryAdd object, which, in turn, displays the screen shown in FIG. 10. The Add Query screen 1000 contains a text field 1002 which allows entry of a new query name and a text field 1004 which allows entry of the SQL query text.

The database schema area 1008 displays details of the database schema which have been previously retrieved, by means of a database schema access query object or in another manner as previously described. The display consists of a scrolling list 1016 of tables, views and stored procedures. When one of these database "objects" is selected, its schema description, including column names 1018 and data types 1020 can be displayed. The schema display assists a user in correctly constructing the query string in text box 1004.

After the SQL query string has been constructed in text box 1004, the user can press the "Apply" command button 1010 which calls a method in the QryAdd object that first checks the query parameters to determine if they are valid and then submits the query to the underlying database query engine to determine whether the query syntax is proper. In a preferred embodiment, a method in the aforementioned database schema object is used to submit the query to the database and to rollback any changes in the database to prevent the query syntax test from modifying data. If the query is correct then the QryAdd object adds the query to the query object.

The user can use the "Cancel" button 1012 to cancel the add query object operation or the "Clear" button 1014 which clears the contents of the text fields 1002 and 1004. In either case the GUI redisplays the main screen illustrated in FIG. 8.

Figure 11:
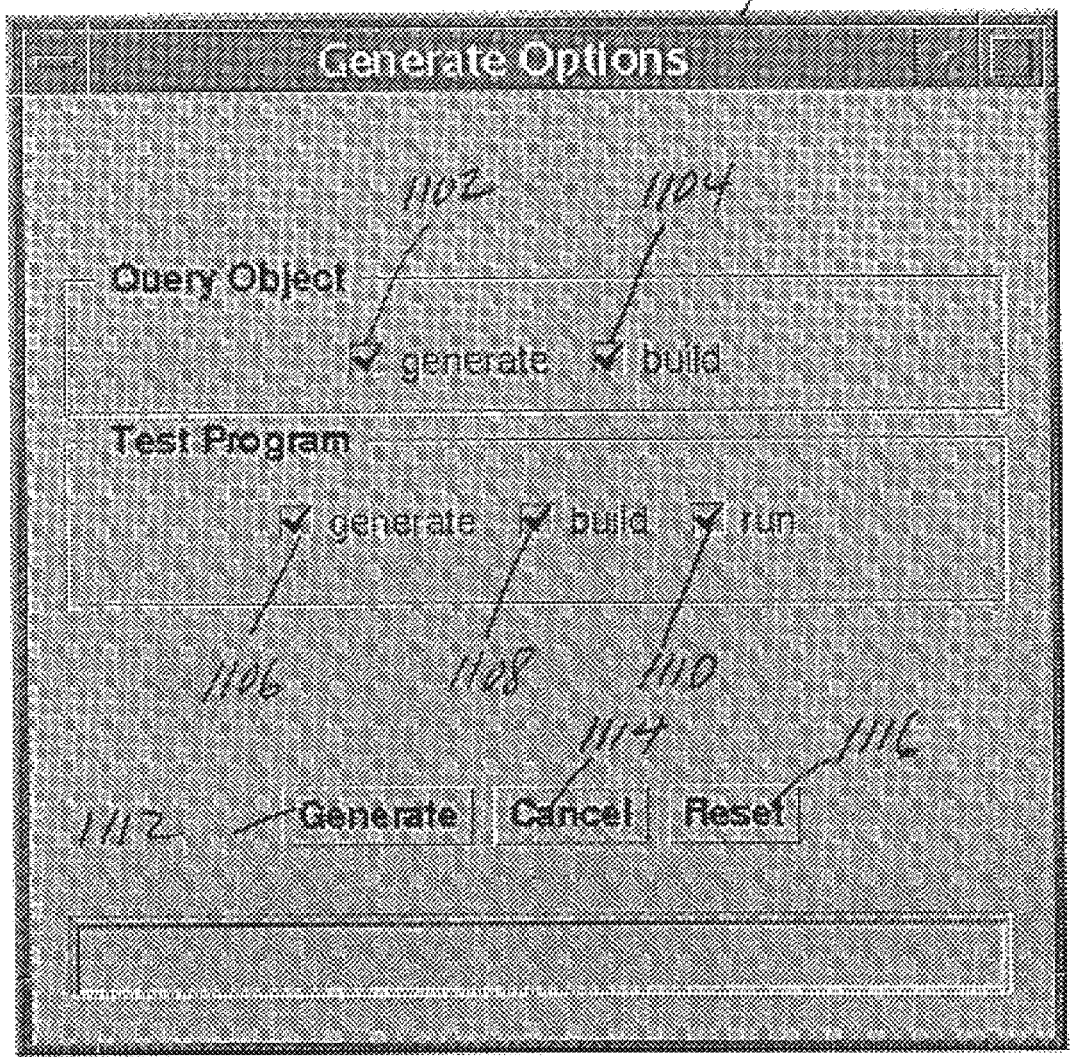
FIG. 11 is a generate screen display generated of the inventive generator tool GUI.

The generate display screen is illustrated in FIG. 11. This screen is generated by the generate object instantiated from the generate class 606 (FIG. 6.) Code for a query object can be generated by manipulating screen 1100 which displays two options for the query object which are controlled by checkboxes 1102 and 1104. These options allow the code for the query object to be generated and built, respectively.

After options have been selected, the corresponding operations are initiated when the user presses the "Generate" command button 1112. The "Generate" command button 1112 creates a thread which, depending on the state of the checkboxes 1102–1110, generates the code for the query test object, builds the query test object from the generated code, generates code implementing a test GUI, builds the test GUI and runs the test GUI.

In particular, the thread instantiates a code generator object which generates the code required to implement the query object as defined by the internal state object. The code generator classes are arranged in a hierarchy so that a generator object can be instantiated which generator object is specific to the database to be accessed and the language to which the implementation is targeted.

The code generator object then generates both interface code to allow a client to access the object and code which implements the object for a specific DBMS and transactional model. A preferred method for generating the query object code is to use a set of code generator sections which print predetermined text strings. Specific generator sections can then be selected based on the SQL input string.

Also, in accordance with a preferred embodiment, the code generator object generates build scripts which can be run to compile and build the query object depending on the checkboxes 1102, 1104 which are selected in the generate screen display. Code generation options can be canceled when the user presses the "Cancel" command button 1114. Finally, the "Reset" command button 1116 causes the checkboxes 1102–1110 to be reset to their default configuration.

As previously mentioned, a test GUI can also be generated by the query object generator tool. Three options, represented by checkboxes 1106, 1108 and 1110, allow code for this test program to be generated and built (code generation and building are controlled by checkboxes 1106 and 1108.) The program can optionally be run as controlled by checkbox 1110. The test object source code generated by the code generator operates with a test framework to generate a customized GUI which allows a user to view and manipulate a query object. In particular, the test framework consists of three classes: the TestQO class, the TestQOFrame class and the RunQuery class.

The TestQO class is a test driver class designed to work as an application or a JAVA applet which is launched by the aforementioned thread and instantiates an object from the TestQOFrame class in order to create a GUI window. The TestQOFrame object then displays the resulting screen display. This screen display is illustrated in FIG. 12 and allows a user to select one of the queries in the associated query object and to run the query. In particular, the TestQOFrame class creates a push button 1202 for each query on the screen display which push button is labeled with the name of the query and permits the user to-a method in the query object which, in turn, causes the query object to perform the query. A stop button 1204 is also provided to cancel testing.

The RunQuery class is instantiated to set up and run a query under control of the buttons 1202 created on the test GUI display 1200 by the TestQOFrame object. The RunQuery class contains a constructor which constructs the RunQuery object and an action( ) function for processing button presses.

Figure 13A:
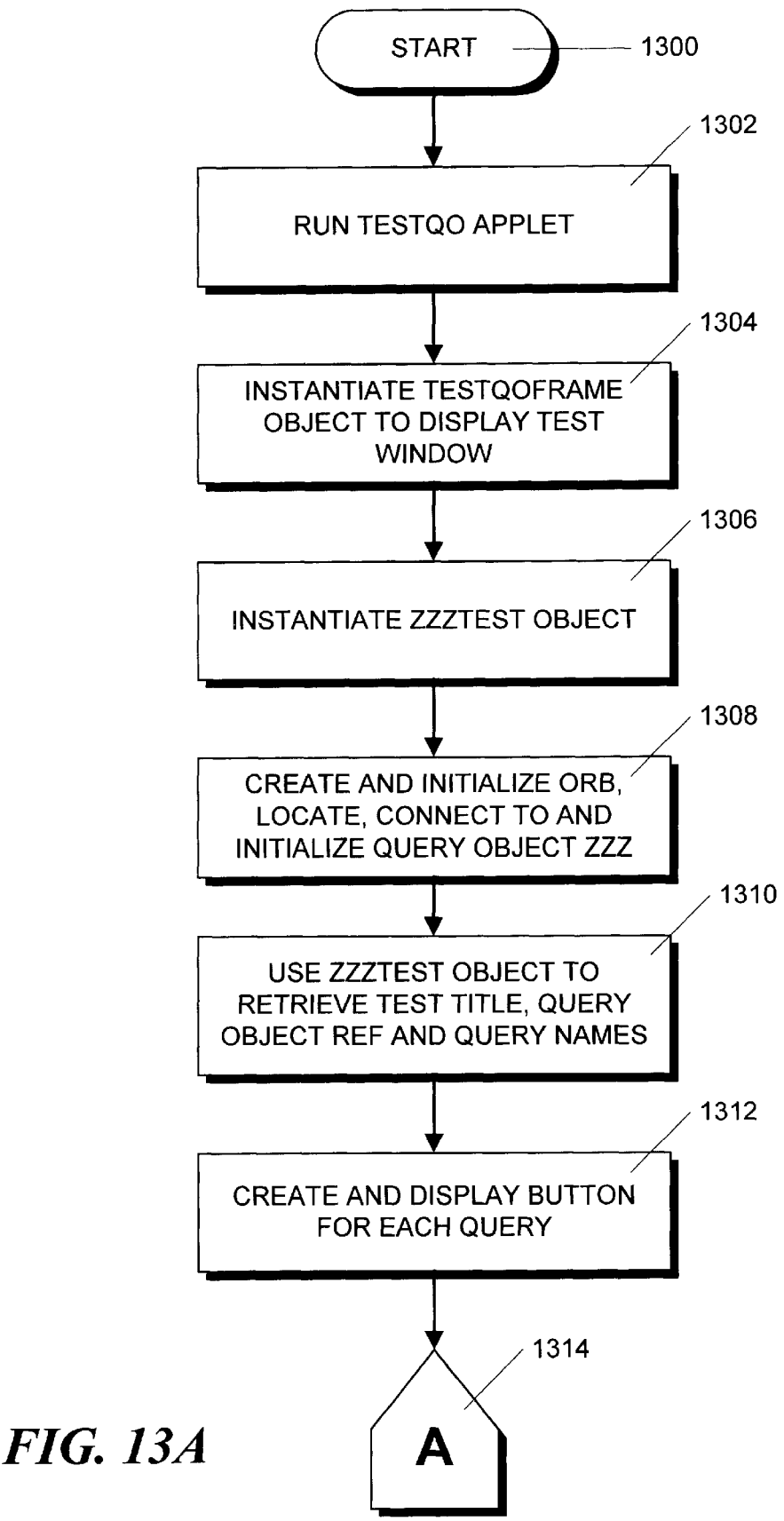
FIGS. 13A and 13B, when placed together, form a flowchart which illustrates it the steps in a routine for performing a query object test.
Figure 13B:
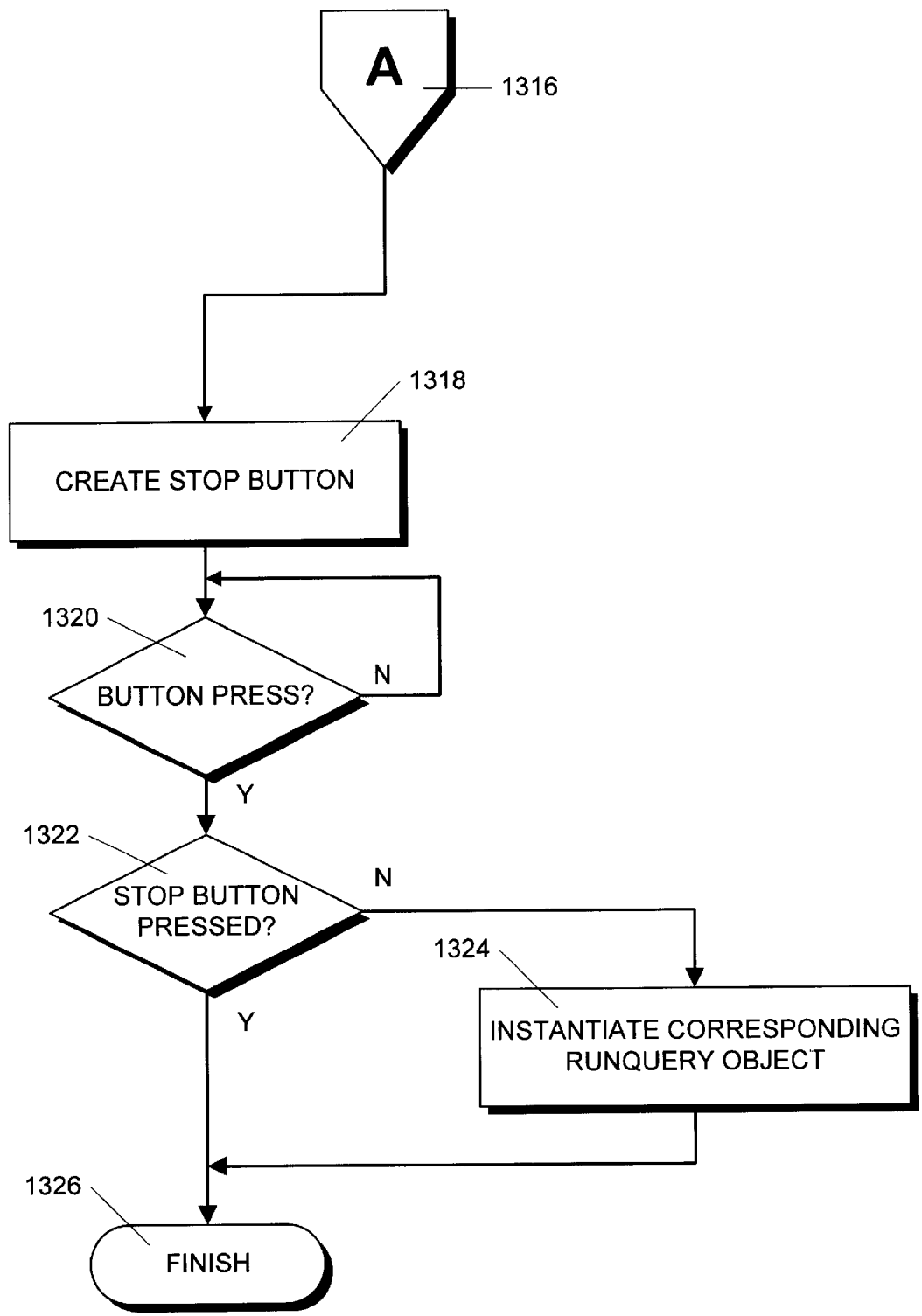

The routine for performing a query object test is illustrated in FIGS. 13A and 13B which, when placed together, form a flowchart. Such a routine might be initiated, for example, by the aforementioned thread that is used to generate and build the query object. When the TestQO applet is run, it instantiates a TestQOFrame object as indicated in step 1304. The TestQOFrame object is used to generate the display window, shown in FIG. 12.

When the TestQOFrame class is instantiated, its constructor calls a method in the TestQO applet. This method instantiates a test object generated for the query object under test as indicated in step 1306. The constructor of this object also creates and initializes the ORB which is necessary to connect to the query object in a CORBA environment. If a CORBA environment is not used then the test object can be located in another conventional manner, such as with a naming service that returns a reference to the object. Using the ORB, the test object constructor obtains the route naming context from the ORB, looks up the object reference for the query object implementation in the CORBA server and initializes the query object as indicated in step 1308.

Other methods in the TestQOFrame object then obtain information about the query object from the test object as indicated in step 1310. The values returned by these methods are used to create the test window 1200 generated by the TestQOFrame class constructor. In step 1312, a pushbutton 1202 is created and displayed for each query with the name of the query displayed on the pushbutton. The routine then proceeds, via off-page connectors 1314 and 1316, to step 1318 where a "stop" button 1204 is created and displayed.

Next, in step 1320, a method in the TestQOFrame object waits for a button press. If no button press is detected, the routine returns to step 1320 and continues waiting. Alternatively, if a button press is detected in step 1320, the routine proceeds to step 1322, in which a determination is made whether the stop button 1004 has been pressed. If so, the routine finishes in step 1326.

Alternatively, if, in step 1322, the stop button has not been pressed, then the routine proceeds to step 1324 in which an object is instantiated from the RunQuery class 706. When the RunQuery class is instantiated, the query name, located on the button is passed in as a parameter.

A method in the RunQuery object retrieves the query input parameter names and the output column titles from the query test object and uses these names to display a window with input parameter names and output column titles such as that illustrated in FIG. 14.

The display screen 1400 has an input parameter entry area with the parameter input name 1402 identifying the parameter. Two buttons, 1404 and 1406, are also created on the screen which allow the query to be performed or dismissed, respectively.

Also included on the screen, are a number of columns, 1408 which display the output data. The output titles 1418 are the titles received from the query test object.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. An integrated development environment operable in a computer with a memory for generating source code which implements and tests a query object that accesses a database, the query object having a method that, when invoked, submits a predefined query to the database, the environment comprising:

an internal state store which stores database-independent information representing the query object in the memory, the database-independent information including a database-independent query to be implemented by the query object;

a first code generator which is responsive to the database-independent information for generating source code which implements the query object and the method from the database-independent query;

a second code generator which is responsive to the database-independent information for generating test code for the query object;

a builder which is responsive to the source code which implements the query object for building a query object program and is responsive to the source code which implements the test code for building a test program; and a test framework which operates with the test program to test the query object.

2. An integrated environment according to claim 1 wherein the database independent information is textual information.

3. An integrated environment according to claim 1 further comprising a graphic user interface which generates a display screen for the query object, the display screen displaying database-independent information for each query in the query object.

4. An integrated environment according to claim 3 wherein the graphic user interface comprises an input mechanism which receives the database-independent query from a user and stores the database-independent query in the internal state store.

5. An integrated environment according to claim 3 wherein the graphic user interface controls the first and second code generators and the builder.

6. An integrated environment according to claim 3 further comprising a database schema access object which includes a method for retrieving database metadata.

7. An integrated environment according to claim 6 wherein the database schema access object includes a method for retrieving database stored procedures.

8. An integrated environment according to claim 6 wherein the database schema access object displays the metadata on the display screen to enable the user to formulate the database-independent query.

9. An integrated environment according to claim 1 wherein the test framework a generates a graphic user interface which controls testing of the query object.

10. An integrated environment according to claim 1 wherein the query object is a a distributed object and the first code generator is responsive to the database-independent information for generating source code which implements interface definitions for the query object.

11. An integrated environment according to claim 1 wherein the test code is class code for a distributed test object and the second code generator is responsive to the database-independent information for generating test code which implements interface definitions for the test object.

12. An integrated environment according to claim 11 wherein the query object is a distributed object and the test program installs the query object program as a server, connects to the query object and test the query object.

13. A method for providing an integrated development environment operable in a computer with a memory for generating source code which implements and tests a query object that accesses a database, the query object having a method that, when invoked, submits a predefined query to the database, the method comprising the steps of:

(a) storing database-independent information representing the query object in the memory, the database-independent information including a database-independent query to be implemented by the query object;

(b) generating source code which implements the query object and the method from the database-independent query in response to the database-independent information;

(c) generating test-code for the query object in response to the database-independent information;

(d) building a query object program from the source code which implements the query object and building a test program from the source code which implements the test code; and (e) operating the test program with a test framework to test the query object.

14. A method according to claim 13 wherein the database independent information is textual information.

15. A method according to claim 13 further comprising the step of:

(f) generating a display screen for the query object, the display screen displaying database-independent information for each query in the query object.

16. A method according to claim 15 wherein step (f) comprises the step of:

(f1) using a graphic input mechanism to receive the database-independent query from a user and to storethe database-independent query in the memory.

17. A method according to claim 16 wherein the screen display controls steps (b),(c) and (d).

18. A method according to claim 16 further comprising the step of:

(g) retrieving database metadata with a database schema access object.

19. A method according to claim 18 wherein step (g) comprises the step of:

(g1) retrieving database stored procedures with the database schema access object.

20. A method according to claim 18 further comprising the step of:

(h) using the database schema access object to display the metadata on the display screen to enable the user to formulate the database-independent query.

21. A method according to claim 13 wherein step (e) comprises the step of:

(e1) using the test framework to generate a graphic user interface which controls testing of the query object.

22. A method according to claim 13 wherein the query object is a distributed object and wherein step (b) comprises the step of:

(b1) generating source code which implements interface definitions for the query object.

23. A method according to claim 13 wherein the test code is class code for a distributed test object and wherein step (c) comprises the step of:

(c1) generating test code which implements interface definitions for the test object.

24. A method according to claim 23 wherein the query object is a distributed object and step (e) comprises the steps of:

(e2) installing the query object program as a server;

(e3) connecting to the query object; and (e4) testing the query object.

25. A computer program product for providing an integrated development environment operable in a computer with a memory for generating source code which implements and tests a query object that accesses a database, the query object having a method that, when invoked, submits a predefined query to the database, the computer program product comprising a computer usable medium having computer readable program code thereon, including:

program code for storing database-independent information representing the query object in the memory, the database-independent information including a database-independent query to be implemented by the query object;

program code for generating source code which implements the query object and the method from the database-independent query in response to the database-independent information;

program code for generating test code for the query object in response to the database-independent information;

program code for building a query object program from the source code which implements the query object and building a test program from the source code which implements the test code; and test framework program code which operates with the test program to test the query object.

* * * * *